(12) United States Patent
Selby et al.

(10) Patent No.: US 7,857,474 B2
(45) Date of Patent: Dec. 28, 2010

(54) LASER ETCHED GRAPHIC FOR A DECORATIVE SURFACE

(75) Inventors: Steven Selby, Madison, AL (US); Vyacheslav B. Birman, Auburn Hills, MI (US); Qiling Yu, Troy, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 125 days.

(21) Appl. No.: 12/271,059

(22) Filed: Nov. 14, 2008

(65) Prior Publication Data

US 2009/0129050 A1 May 21, 2009

Related U.S. Application Data

(60) Provisional application No. 61/003,468, filed on Nov. 16, 2007.

(51) Int. Cl.
*F21V 13/04* (2006.01)
(52) U.S. Cl. .................. 362/97.1; 362/29; 362/293; 362/489
(58) Field of Classification Search .......... 362/29, 362/231, 259, 26–30, 559, 489, 488, 97.1–97.4, 362/293; 264/132; 216/4, 28, 94
See application file for complete search history.

(56) References Cited

U.S. PATENT DOCUMENTS

| | | | |
|---|---|---|---|
| 4,874,110 A * | 10/1989 | Klein et al. | 220/241 |
| 6,277,312 B1 | 8/2001 | Hansen et al. | |
| 7,506,996 B2 * | 3/2009 | Birman et al. | 362/236 |
| 7,671,859 B2 * | 3/2010 | Birman et al. | 345/426 |
| 2005/0162090 A1 * | 7/2005 | Birman et al. | 315/56 |

FOREIGN PATENT DOCUMENTS

| | | |
|---|---|---|
| DE | 4134271 | 12/1992 |
| DE | 4212423 | 10/1993 |
| DE | 19541453 | 5/1996 |
| DE | 19758496 | 3/1999 |
| DE | 19758496 A1 * | 3/1999 |
| DE | 102006005089 | 8/2007 |
| EP | 1248275 | 10/2002 |
| WO | 01/15916 | 3/2001 |
| WO | 03025681 | 3/2003 |

OTHER PUBLICATIONS

English Translation of Detailed Description of German Publication DE 19758496 A1.*
Partial International Search dated May 19, 2009.
International Search Report and Written Opinion mailed Aug. 4, 2009.
International Preliminary Report on Patentability for PCT/US2008/083736 mailed on May 27, 2010.

* cited by examiner

*Primary Examiner*—Thomas M Sember

(57) ABSTRACT

An example vehicle instrument panel includes a control panel having illuminated buttons formed with an illuminatable decorative surface. The disclosed decorative surface includes a translucent layer disposed between a background layer and a graphic layer. Material is removed from the background layer to reveal the underlying translucent and graphic layers. The depth within which material is removed is determined to fall within a thickness of the translucent layer such that any variation in depth is accommodated within the translucent layer.

19 Claims, 3 Drawing Sheets

LASER ETCHED GRAPHIC FOR A DECORATIVE SURFACE

CROSS REFERENCE TO RELATED APPLICATION

The application claims priority to U.S. Provisional Application No. 61/003,468 which was filed on Nov. 16, 2007.

BACKGROUND OF THE INVENTION

This disclosure generally relates to an etched display and method of making an etched display. The etched display includes a dark coating over a lighter coating. The dark coating is removed to expose the underlying lighter coating. A graphic symbol or word is etched and provides the desired visual reference. A light source can be included to provide an illuminated appearance for the etched graphic. In such lighted applications, the removal of the dark coating reveals the shape of the desired illuminated graphic.

Disadvantageously, variations in material removal can result in an undesired appearance of the graphic. Accordingly, it is desirable to design and develop methods and graphic displays that reduce process variations.

SUMMARY OF THE INVENTION

A disclosed vehicle instrument panel includes a control panel having illuminated buttons formed with an illuminatable decorative surface. The decorative surface includes features that accommodate variations in material removal.

The disclosed decorative surface includes a translucent layer disposed between a background layer and a graphic layer. Material is removed from the background layer to reveal the underlying translucent and graphic layers. A depth within which material is removed falls within a thickness of the translucent layer. Therefore, any variation in depth is accommodated within the translucent layer.

Another disclosed decorative surface includes features to provide a substantially uniform color appearance in illuminated and non-illuminated conditions. The illuminated and non-illuminated appearance remains substantially the same because the example decorative surface provides for light to travel through a combination of the first and second colored surfaces twice during both the illuminated and the non-illuminated conditions.

These and other features of the present invention can be best understood from the following specification and drawings, the following of which is a brief description.

DETAILED DESCRIPTION OF THE PREFERRED EMBODIMENT

Figure 1:
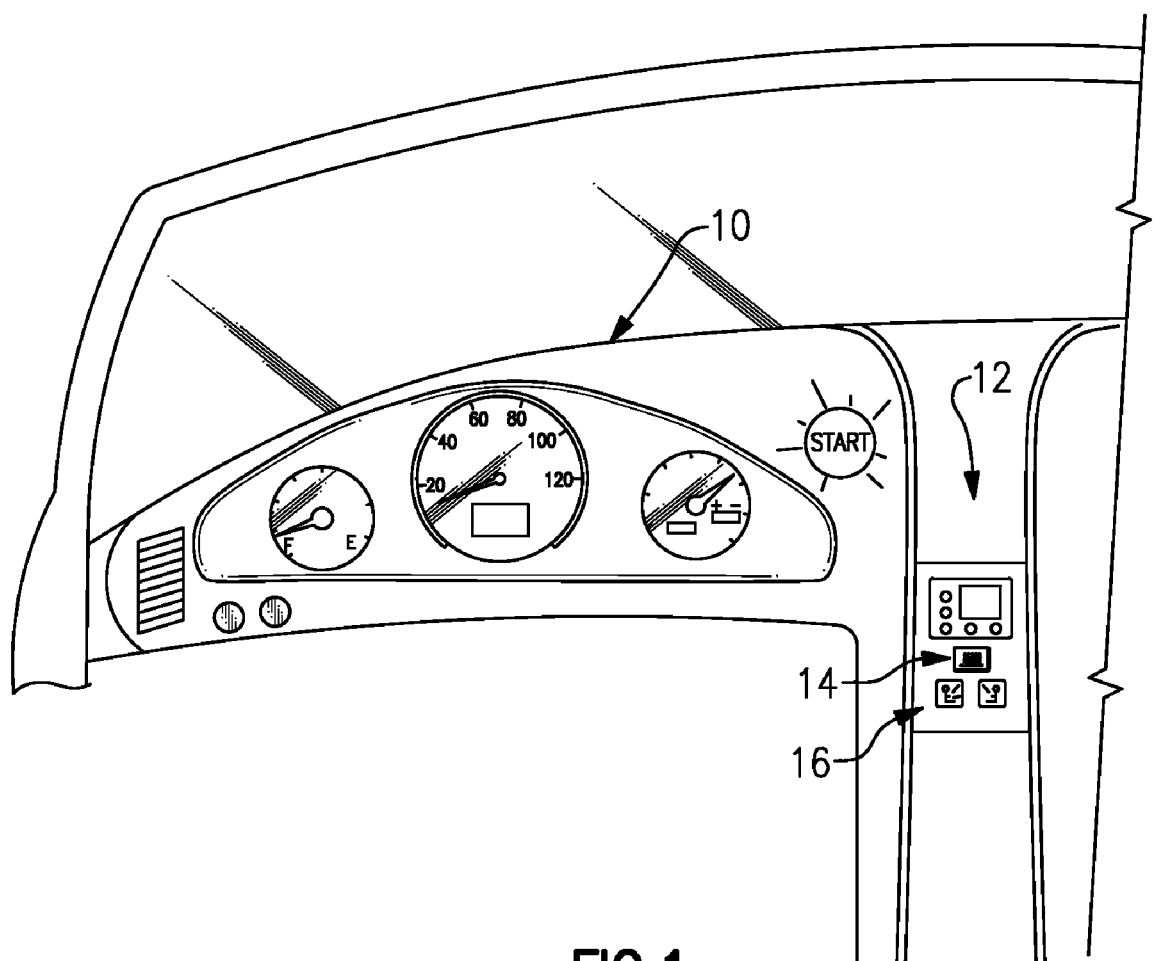
FIG. 1 is a schematic view of a vehicle instrument panel including illuminated buttons.

Referring to FIG. 1, an example vehicle instrument panel 10 includes a control panel 12 including illuminated buttons 14, 16 for controlling features of the vehicle. Buttons 14, 16 can be utilized for, window defrosters, heated seats, other climate control features, or any other control device utilized in a vehicle.

Figure 2:
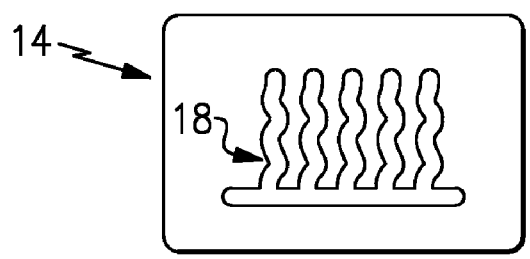
FIG. 2 is a schematic view of an example illuminated button.

Referring to FIG. 2, the example illuminated button 14 includes a graphic 18 that represents a window defroster. The button 14 is illuminatable to indicate that the defroster is operating or alternatively as part of illumination scheme of the instrument panel 10 for night time conditions. As appreciated, although a button is disclosed by way of example, other illuminated surfaces as are utilized for displaying information are within the contemplation of this invention.

Figure 3:
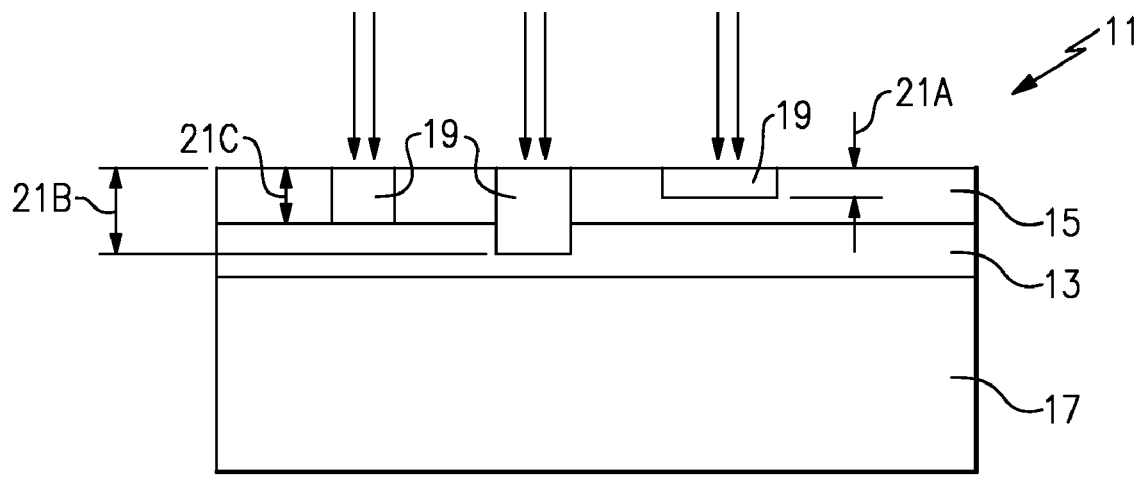
FIG. 3 is a cross-section of a prior art etched illuminated surface

Referring to Prior Art FIG. 3, an etched graphic is constructed by removing portions of a dark masking top layer 15. The top layer 15 is coated over a lighter layer 13 supported on a substrate 17. A light source 34 provides light through the substrate 17. The graphic symbol 19 is created by removing portions of the masking top layer 15 by various processes including the laser etching. Removal of the top layer 15 is subject to variations in depth. As is illustrated, the depth of material removal is desired to remove only the top masking layer as is indicated by depth 21C. However, imperfections in the process can result in to little material removal as indicated by depth 21A, or to much material removal as indicated by depth 21B. To much, or to little material removal removes the graphic layer, causing a variation in the color of the graphic.

Figure 4:
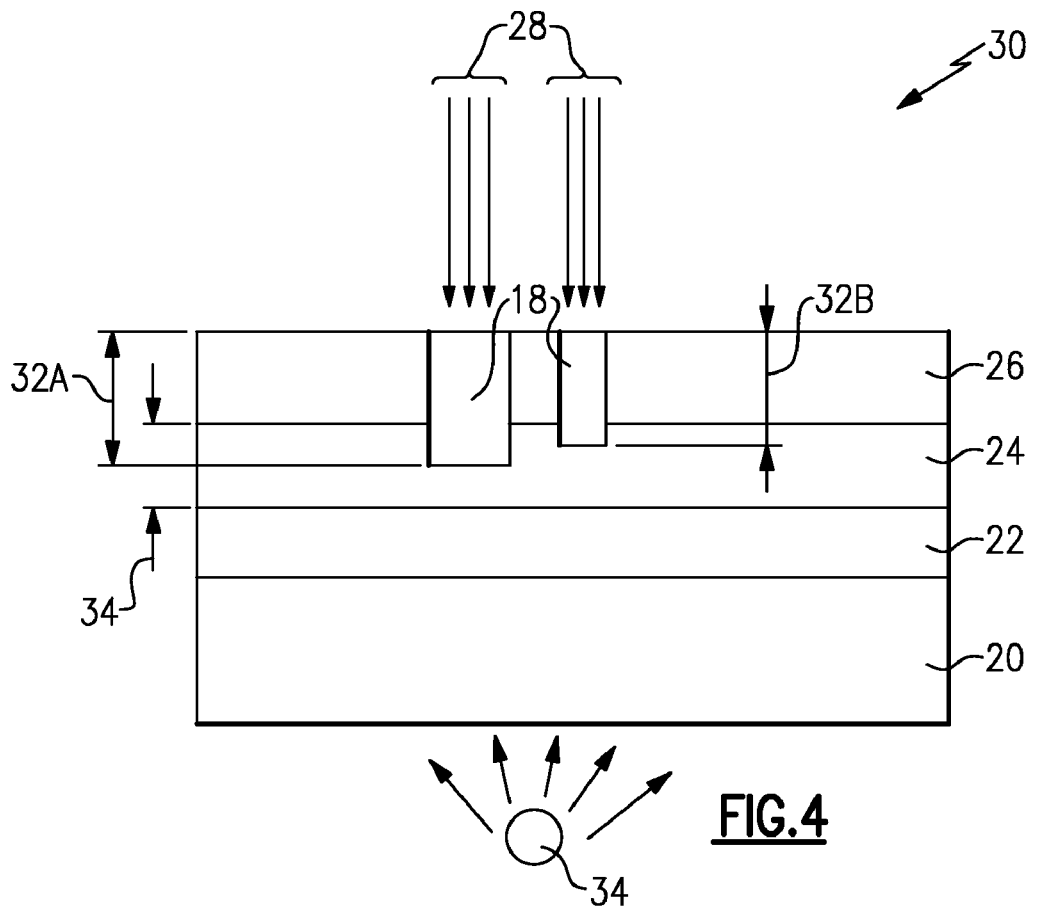
FIG. 4 is a cross-section of an example etched illuminated surface.

Referring to FIG. 4, an example decorative surface 30 according to this invention accommodates variations in material removal with a translucent layer 24 disposed between a background layer 26 and a graphic layer 22. The graphic layer 22 is coated onto a clear substrate 20 and provides the desired color of the illuminated graphic. The background layer 26 provides a mask that prevents the transmission of light from the light source 34, except through the open areas that define the graphic 18.

In this example, laser energy 28 is utilized to remove material from the background layer 26 to reveal the underlying translucent and graphic layers 24, 22. Other material removal methods are within the contemplation of this invention. The graphic layer 24 defines the desired color of the graphic 18. In this example the graphic layer 24 is white, however other colors can be utilized to provide a desired appearance. The color of the graphic layer is provided at a first density. The example translucent layer is also provided in white to match the underlying graphic layer 22. However, the translucent layer 22 is provided at a second density, that is much less than the first density of the graphic layer.

The difference in densities between the graphic layer 22 and the translucent layer 24 provides the total color density that is visible in an illuminated condition. Because the second density of the translucent layer is much less than that of the first density of the graphic layer, variations in material removed during formation of the graphic do not have a large impact on appearance.

During formation of the graphic 18, laser energy 28 is directed to remove material from the background layer 26. The depth within which material is removed is determined to fall within a thickness 34 of the translucent layer 24. Accordingly, any variation in depth is accommodated within the translucent layer 24. In the illustrated example, a first depth 32A is greater than a second depth 32B. However, even though there is a variation in depth, material is removed from the background layer 26 and the translucent layer 24. Nothing is removed from the graphic layer 22. Accordingly, even with the variation in depths 32A and 32B, the overall difference in density between the different depths is minimal. This is so because the first density is much greater than that of the second density. Accordingly, taking more or less of the translucent layer 24 does not noticeably change the appearnce of the illuminated graphic 18.

The thickness 34 of the translucent layer 22 is provided such that any variation in material removal depth remains within the translucent layer. Further, although the example translucent layer is described as including a second density of the same graphic color, the example translucent layer may be colorless.

Figure 5:
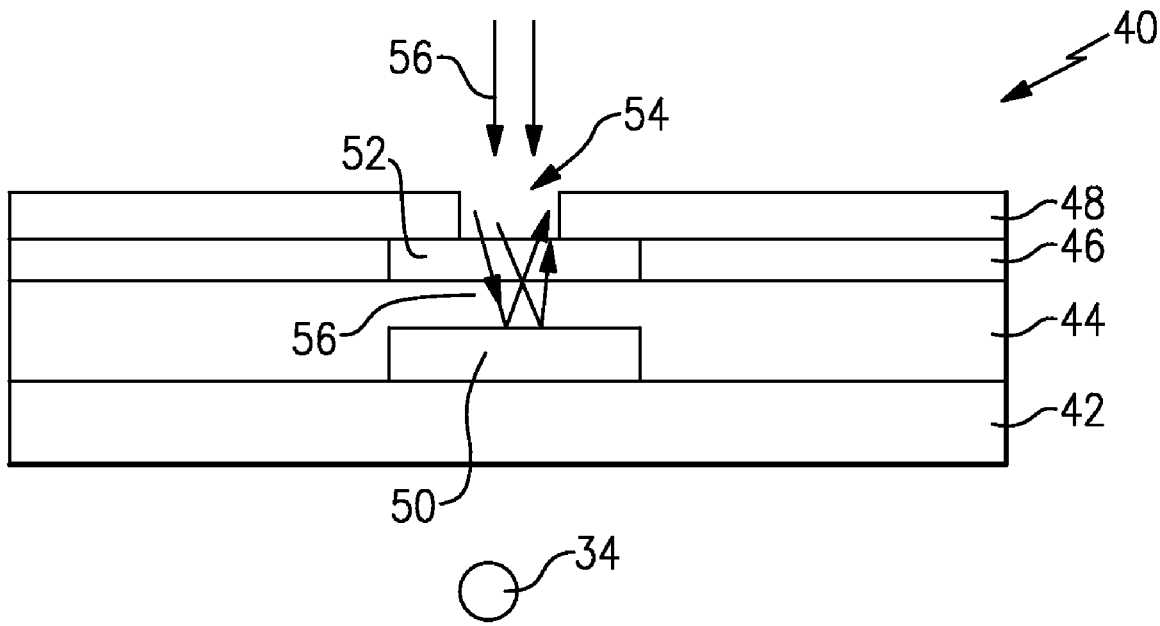
FIG. 5 is a cross-section of another example etched illuminated surface in a non-illuminated condition.
Figure 6:
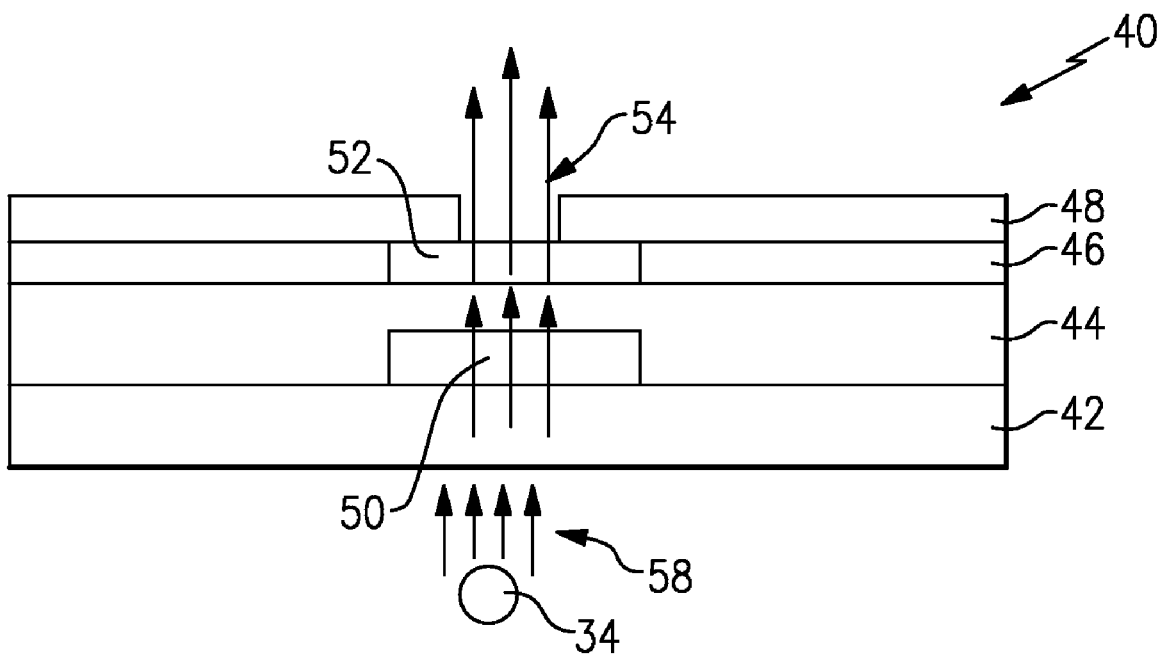
FIG. 6 is a cross-section of the etched illuminated surface of FIG. 5 in an illuminated condition.

Referring to FIGS. 5 and 6, another example illuminatable surface 40 includes features to provide a substantially uniform color appearance in illuminated and non-illuminated conditions.

The appearance of any visible surface is dependent to some extend on how light interacts with that surface. In conventional illuminated surfaces, during daylight conditions incident light may travel through the illuminatable graphic surface and then reflect back up through the same surface. In an illuminated condition, light from a light source will travel through the graphic surface in one direction at only one time. Accordingly, because light travels through the graphic surface twice in a non-illuminated condition, and once in an illuminated condition, day and night time appearance of the same illuminated surface or button can be undesirably different.

In the example decorative surface 40 a white layer 44 is disposed over a clear substrate 42 positioned to received light from a light source 34. A first colored layer 50 is disposed within the white layer 50 below the graphic location 54. First and second background layers 46, 48 are disposed over the white layer 44. Within the first background layer 46 and proximate the graphic location 54 is a second colored layer 52.

Referring to FIG. 5, during the non-illuminated condition, incident light 56 from ambient sources will travel through the first colored surface 52, and reflect back up through the same surface 52 such that light travels through the colored surface 52 twice.

Referring to FIG. 6, during an illuminated condition light 58 from the light source 34 travels through the substrate 42, the first colored layer 50 and the second colored layer 52 such that light travels through a colored surface twice. Accordingly, the illuminated and non-illuminated appearance remains substantially the same because light travels through a combination of the first and second colored surfaces 50, 52 twice during both the illuminated and the non-illuminated conditions.

In the disclosed example, the first colored layer 50 and the second colored layer 52 are the same, however, each colored layer may be different to provide a desired appearance and to account for different light spectrums produced by different light sources. For example, an incandescent light bulb produces light in a spectrum more intensely yellow and red as compared to ambient daytime light. Accordingly, the colored layers 50, 52 can be adjusted to provide the same color hue as is provided by ambient daytime light. In such an application both or just one of the first and second colored layers 50, 52 can be modified to provide the desired light wavelengths required to provide the desired consistent appearance between illuminated and non-illuminated conditions.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of etching a graphic onto a surface comprising the steps of:
    applying a graphic coating onto a base surface;
    applying a transparent layer over the graphic coating;
    applying a background coating over the transparent layer; and
    removing portions of the background coating and the transparent layer in a desired shape of the graphic to create a path for light through the graphic coating and the transparent layer, wherein the transparent layer comprises a first thickness and only portions of the transparent layer less than the first thickness are removed in the desired shape of the graphic.

2. The method as recited in claim 1, wherein the removing step includes applying laser energy to the background coating to evaporate portions of the background coating and the transparent layer.

3. The method as recited in claim 1, including the step of providing a depth tolerance for the removing step, the depth tolerance being less then a thickness of the transparent layer.

4. The method as recited in claim 1, wherein the graphic coating comprises a first density and the transparent coating comprises a second density less then the first density.

5. The method as recited in claim 4, wherein the graphic coating and the transparent coating each comprise a common color.

6. The method as recited in claim 5, wherein the graphic layer comprises white paint and the background layer comprises black paint.

7. An illuminated backlit structure comprising:
    a graphic layer that is illuminatable;
    a background layer that blocks the transmission of light, .wherein the background layer includes a shaped opening through which the graphic layer is visible;
    a transparent layer disposed between the graphic layer and the background layer, the transparent layer including a first total thickness with a second thickness less than the first total thickness removed in an area corresponding with the shaped opening through the background layer; and
    a light source for illuminating the graphic layer.

8. The backlit structure as recited in claim 7, wherein the shaped opening in the background layer comprises a graphic symbol representing a function.

9. The backlit structure as recited in claim 7, wherein the graphic layer is supported on a clear plastic substrate.

10. The backlit structure as recited in claim 7, wherein the graphic layer comprises a first coating having a first density and the transparent layer comprises a second coating having as second density less than the first density.

11. The backlit structure as recited in claim 10, wherein the first coating and the second coating comprise a common color.

12. The backlit structure as recited in claim 7, wherein the structure comprises an illuminated button.

13. The backlit structure as recited in claim 7, wherein the shaped opening in the background layer comprises material removed from the background layer and the transparent layer.

14. The backlit structure as recited in claim 13, wherein material is removed from the background layer and the transparent layer with laser energy.

15. A backlit decorative structure comprising:
- a substrate;
- a first color layer coated onto the substrate;
- a graphic layer disposed over the first color layer;
- a second color layer coated over the graphic layer;
- a background layer coated over the second color layer, the background layer including removed portions through which the second color layer is visible to define a desired graphic; and
- a light source for illuminating the desired graphic, wherein the graphic layer reflects ambient light back through the first color layer and the removed portion of the background layer.

16. The decorative structure as recited in claim 15, wherein the first color layer, the second color layer and the graphic layer are translucent such that light can be transmitted therethrough.

17. The decorative structure as recited in claim 15, wherein in an illuminated condition light is transmitted once through each of the first color layer and the second color layer.

18. The decorative structure as recited in claim 17, wherein in a non-illuminated condition incident ambient light travels through the second color layer twice.

19. The decorative structure as recited in claim 15, wherein the first color layer and the second color layer comprise different colors.

* * * * *